US010805093B2

(12) United States Patent
Van Der Sluis et al.

(10) Patent No.: US 10,805,093 B2
(45) Date of Patent: Oct. 13, 2020

(54) CRYPTOGRAPHIC DEVICE COMPRISING A PHYSICAL UNCLONABLE FUNCTION

(71) Applicant: INTRINSIC ID B.V., Eindhoven (NL)

(72) Inventors: Erik Van Der Sluis, Bilthoven (NL); Marten Van Hulst, Oisterwijk (NL)

(73) Assignee: INTRINSIC-ID B.V., Eindhoven (NL)

( * ) Notice: Subject to any disclaimer, the term of this patent is extended or adjusted under 35 U.S.C. 154(b) by 341 days.

(21) Appl. No.: 15/513,440

(22) PCT Filed: Sep. 22, 2015

(86) PCT No.: PCT/EP2015/071708
§ 371 (c)(1),
(2) Date: Mar. 22, 2017

(87) PCT Pub. No.: WO2016/058793
PCT Pub. Date: Apr. 21, 2016

(65) Prior Publication Data
US 2017/0310489 A1 Oct. 26, 2017

(30) Foreign Application Priority Data
Oct. 13, 2014 (EP) ..................................... 14188612

(51) Int. Cl.
*G06F 21/00* (2013.01)
*H04L 9/32* (2006.01)
(Continued)

(52) U.S. Cl.
CPC .............. *H04L 9/3278* (2013.01); *G09C 1/00* (2013.01); *H04L 9/0866* (2013.01);
(Continued)

(58) Field of Classification Search
CPC . H04L 9/3278; H04L 9/30; H04L 9/14; H04L 9/0869; H04L 9/0866; H04L 2209/12; G09C 1/00
See application file for complete search history.

(56) References Cited

U.S. PATENT DOCUMENTS 10,002,277 B1 * 6/2018 Endress ................ H04L 9/3278
2008/0279373 A1 11/2008 Erhart et al.
(Continued)

FOREIGN PATENT DOCUMENTS

JP  2008-516472 A  5/2008
JP  2008526078 A   7/2008
(Continued)

OTHER PUBLICATIONS

International Search Report and Written Opinion dated Jan. 29, 2016 in International Application No. PCT/EP2015/071708.
(Continued)

*Primary Examiner* — Kendall Dolly
(74) *Attorney, Agent, or Firm* — Kenealy Vaidya LLP

(57) ABSTRACT

Some embodiments are directed to an electronic cryptographic device including a physically unclonable function and an enrollment unit configured to generate a first PUF data during the enrollment phase, the first PUF data derived from a first noisy bit string of the PUF, the first PUF data uniquely identifying the physically unclonable function, the first PUF data including a first helper data. The first PUF data is transmitted to an electronic server during an enrollment phase. The device includes a use-phase unit configured to generate a second PUF data derived from a second noisy bit string during a use phase. The first helper data is received from the server in response to transmitting the second PUF data. An error corrector is configured to apply the first helper data to the second noisy bit string.

20 Claims, 6 Drawing Sheets

(51) Int. Cl.
    *H04L 9/08* (2006.01)
    *G09C 1/00* (2006.01)
    *H04L 9/14* (2006.01)
    *H04L 9/30* (2006.01)

(52) U.S. Cl.
    CPC .............. *H04L 9/0869* (2013.01); *H04L 9/14* (2013.01); *H04L 9/30* (2013.01); *H04L 2209/12* (2013.01)

(56) References Cited

U.S. PATENT DOCUMENTS

2009/0183248 A1* 7/2009 Tuyls .................... H04L 9/3278
                                                                  726/9
2009/0217045 A1* 8/2009 Skoric ................... H04L 9/3234
                                                                  713/172
2012/0204023 A1    8/2012 Kuipers et al.

FOREIGN PATENT DOCUMENTS

| JP | 2011198317 A | 10/2011 |
| JP | 2015154291 A | 8/2015 |
| WO | 2006038183 A1 | 4/2006 |
| WO | 2015/200196 A1 | 12/2015 |

OTHER PUBLICATIONS

Keith B. Frikken et al., "Robust Authentication Using Physically Unclonable Functions", ISC 2009, LNCS 5735, Berlin Heidelberg, pp. 262-277.

Vincent van der Leest, et al., "Soft Decision Error Correction for Compact Memory-Based PUFs Using a Single Enrollment," International Workshop on Cryptographic Hardware and Embedded Systems, CHES 2012, pp. 268-282.

* cited by examiner

CRYPTOGRAPHIC DEVICE COMPRISING A PHYSICAL UNCLONABLE FUNCTION

CROSS REFERENCE TO RELATED APPLICATION

This application is a U.S. National Phase filing under 35 C.F.R. § 371 of, and claims priority to, International PCT Patent Application No.: PCT/EP2015/071708, filed on Sep. 22, 2015, which claims priority to European Patent Application No.: 14188612.7, filed on Oct. 13, 2014, the contents of each of which are hereby incorporated in their entireties by reference.

FIELD OF THE INVENTION

The invention relates to electronic cryptographic device, an electronic server, a system, an electronic cryptographic method, an electronic server method, a computer program and a computer readable medium.

BACKGROUND

Authenticating a device before or even after deployment usually involves programming keys into One Time Programmable (OTP) and/or non-volatile memory (NVM) that is embedded in the device. Once the keys have been programmed, device authentication and secure connections can be established. Using these secure connections, features can be unlocked/provisioned using over-the-air updates. The key programming itself is an expensive but necessary step in the process, usually performed by OEM or chip manufacturer.

To supplement this process physical unclonable functions (PUF) have been proposed. One of the main applications of PUFs is to derive cryptographic keys on devices like programmable logic (e.g. FPGAs, PLDs, and DSPs) and Integrated Circuits (ICs). Instead of storing keys in some non-volatile memory, keys are generated only when needed by the device and deleted afterwards. This makes it hard for an attacker to find the key using a physical attack.

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular pre-determined identifier. The manufacturing variations lead to different physical characteristics of the memory element. For example, the physical characteristics may include: doping concentrations, oxide thickness, channel lengths, structural width (e.g. of a metal layer), parasitic (e.g. resistance, capacitance). When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

This property of PUFs makes them suitable for a range of applications. For example, PUFs may be used to combat counterfeiting. Although, it may be possible to fraudulently copy a particular device or other manufactured item, it would not be possible to duplicate a PUF which could be embedded therein with sufficient precision so that it would give rise to the same digital identifier as the original. As a further example, PUFs are used to create cryptographic keys. Using a PUF the need for secure memory to store a key is circumvented. A PUF furthermore provides natural protection against illegal attempts to obtain the cryptographic key through reverse engineering, since damage which could be inflicted to the PUF during the attempt would change the digital identifier. Preferably, the digital identifier is unique for the electronic device wherein the physical unclonable function is embedded. PUFs have been advantageously applied in electronic devices. Even tiny manufacturing variations which are unavoidable during manufacture of an IC lead to different properties of the IC. These different properties are normally suppressed, in an effort to obtain a batch of ICs that operate in the same manner. However, to create a PUF the differences among individual ICs in a batch of ICs are exploited.

For example, it has been observed that the startup behavior of some memory elements, demonstrate PUF like behavior. When such memory is powered-up, it tends to contain content, i.e., comprise a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content. Unfortunately, since the PUF behavior depends on small fluctuations, a certain error percentage is unavoidable. An error correction procedure can be used to correct for these fluctuations, and make sure an identical digital identifier is derived, each time the PUF is used. The error correction procedure sometimes referred to as Fuzzy Extracting, uses so-called helper data.

Although PUFs can replace the need for non-volatile memory during provision of a device with keys, there remained a need for such types of memory. For example, helper data needs to be stored on the device so that the device may correct the noisy output of the PUF.

SUMMARY OF THE INVENTION

An electronic cryptographic device arranged for an enrollment phase and a later use phase is provided as defined in the Claims. The cryptographic device generates a first PUF data during the enrollment phase, derived from a first noisy bit string of physical unclonable function. The first PUF data both uniquely identifies the physically unclonable function, and comprises first helper data, that may later be used to correct for noise in the noisy output of the PUF. In an embodiment, the first PUF data comprises part of the first noisy bit string. In an embodiment, the first helper data itself is used to identify the PUF, and need not contain any other information identifying the PUF. The first PUF data is sent to a server so that when later in a use phase the helper data is needed, it may be requested from the server by sending a second PUF data. The second PUF data is derived from a second noisy bit string generated by the PUF. The second PUF data may comprise part of the noisy bit string to identify the PUF. Interestingly, also the second PUF may comprise helper data. Surprisingly, the server can recognize if two helper data were generated for the same PUF or not. This latter option makes more efficient use of the noisy bit string and may thus use a smaller PUF; on the other hand it requires more processing at the server side.

An aspect of the invention concerns an electronic server as defined in the Claims. The server receives first PUF data from a cryptographic device. The first PUF data comprises first helper data. After receiving the second PUF data the server can recognize the correct first helper data that correspond to the PUF in the cryptographic device that sent the second PUF data. In an embodiment, the second PUF data comprises part of a noisy bit string produced by a PUF of the cryptographic device. Since noisy bit strings produced by the same PUF are close together, e.g., have low hamming distance or otherwise have high correlation, this can be used to identify the PUF. In an embodiment, the second PUF data comprises helper data. Using the helper data in the second PUF the server can identify the helper data received in a first PUF data that corresponds to the same PUF.

The cryptographic device and the server are electronic devices. The cryptographic device may be a mobile electronic device, such as a mobile phone, an integrated circuit, e.g., a SIM card. The cryptographic device is particularly suited to low-costs devices that are produced in large quantities. For example, cryptographic device may be a sensor.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of an electronic cryptographic device, FIG. 1b schematically shows an example of an embodiment of a helper data generator, FIG. 2 schematically shows an example of an embodiment of an electronic server, FIG. 3a schematically shows a first example of data in an embodiment of an electronic cryptographic device during the enrollment phase, FIG. 3b schematically shows a first example of data in an embodiment of an electronic cryptographic device during the use phase, FIG. 4a schematically shows a second example of data in an embodiment of an electronic cryptographic device during the enrollment phase, FIG. 4b schematically shows a second example of data in an embodiment of an electronic cryptographic device during the use phase, FIG. 5 schematically shows an example of an electronic cryptographic method, FIG. 6 schematically shows an example of an electronic server method.

LIST OF REFERENCE NUMERALS IN FIGS. 1-4

Figure 1A:
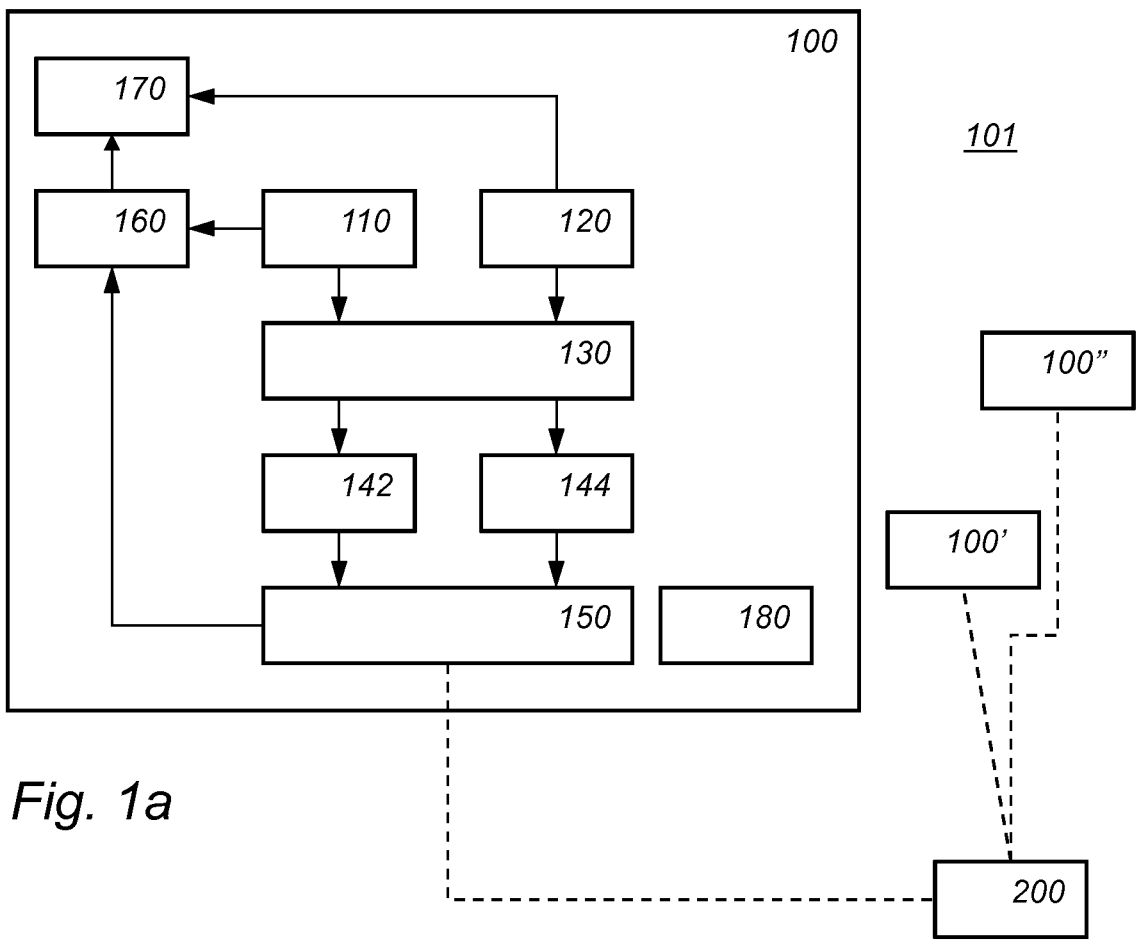

100, 100', 100" an electronic cryptographic device
101 a plurality of cryptographic devices
110 a physically unclonable function (PUF)
120 a random number generator
130 a helper data generator
131 a code word generator
132 a difference unit
133 helper data generator output
142 an enrollment unit
144 a use-phase unit
150 a communication unit
160 an error correction unit
170 a key generator
180 a cryptographic unit
200 an electronic server
210 a communication unit
220 an electronic database
230 a response unit
310 a first noisy bit string
312 a second part of the first noisy bit string
314 a first part of the first noisy bit string
320 a second noisy bit string
322 a second part of the second noisy bit string
324 a first part of the second noisy bit string
330 a first helper data
332 a second helper data
340 a first random bit string
341 a second random bit string
342 a private key
344 a public key
350, 351 a first PUF data
352, 353 a second PUF data

DETAILED DESCRIPTION OF PREFERRED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In the following, for sake of understanding, elements of embodiments are described in operation. However, it will be apparent that the respective elements are arranged to perform the functions being described as performed by them.

FIG. 1a schematically shows an example of an embodiment of an electronic cryptographic device 100.

Cryptographic device 100 is arranged for an enrollment phase and a later use phase. During the enrollment phase, cryptographic device 100 transmits data to a server. Later during the use phase, cryptographic device 100 receives information back from the server. This allows the cryptographic device 100 to work with a secure key even though no storage is required for storing the key or even an identifier for identifying the device. This reduces or even removes the costly personalization step during manufacture of these devices, and reduces or even removes the need for non-volatile re-writable memory on device 100.

Figure 1B:
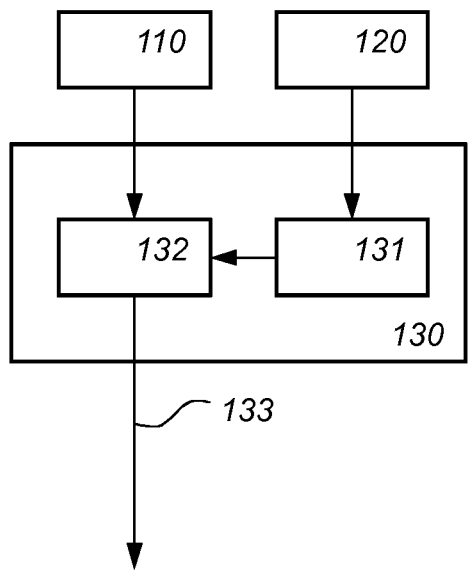

With reference to FIGS. 1a and 1b a possible architecture of device 100 is disclosed.

Cryptographic device 100 comprises a so-called physically unclonable function 110, usually referred to as a PUF. PUF 110 is arranged to produce a noisy bit string, also referred to as the response. For example, PUF 110 may be queried, usually referred to as 'challenged', to produce the noisy bit string. When PUF 110 is challenged multiple times, then PUF 110 will produce the noisy bit string multiple times. The noisy bit string will typically not be identical when produced multiple times. The latter may be resolved by helper data. The amount of change between subsequently produced noisy bit stings differs between different types of PUF; depending on the amount of change an error correcting code may be selected to correct for this amount of error. The noisy bit string is stable enough and long enough to uniquely identify the PUF device. The length of the noisy bit string of the PUF may be chosen with respect to a group of cryptographic devices in which the cryptographic device is uniquely identifiable, e.g., a group of cryptographic devices served by a server 200; and/or the error percentage of the PUF.

PUF 110 may require a power-cycle, e.g., a power-down followed by a power-up to produce the noisy bit string again. In device 100, PUF 110 produces the noisy bit string at least twice. Once during the enrollment-phase, PUF 110 produces a first noisy bit string. Later during the use-phase PUF 110 produces a second noisy bit string. The first and second noisy bit strings are sufficiently close to each other, e.g., the hamming weight of their difference is less than a threshold.

PUFs are random functions bound to a physical device in such a way that it is computationally infeasible to predict the output of the function without actually evaluating it using the physical device. Furthermore, as the PUF is realized by a physical system it is hard to clone. Physical systems that are produced by a production process that is not fully controlled (i.e. that contains some randomness) turn out to be good candidates for PUFs. Depending on the application, a certain amount of randomness can be tolerated as long as the power-up values are sufficiently persistent across different power-ups.

PUF 110 and thus cryptographic device 100 may be uniquely identified based on the response provided by PUF 110.

The PUF's physical system is designed such that it interacts in a complicated way with stimuli and leads to unique but unpredictable responses. The stimuli of a PUF are referred to as the challenge. Some PUF allow a larger range of different challenges, producing different responses. A PUF challenge and the corresponding response are together called a Challenge-Response-Pair. However, a PUF may also have a single challenge. PUF 110 may be a single-challenge PUF. PUF 110 may also be a multiple-challenge PUF. In the latter case, PUF 110 is challenged with the same challenge or set of challenges when producing the noisy bit string, in particular the first and second noisy bit string.

A suitable source of PUFs are formed by an electronic volatile memory that contain, upon power-up, a response pattern of power-up values useful for identification of the memory, the response pattern depending on physical characteristics of the memory elements.

One known example of a PUF used to uniquely identify a device is the so-called SRAM PUF, which is based on the fact that, when an SRAM cell is started up it starts up in a random state due to variations in the threshold voltages of the transistors, which, in turn, are due to doping variations. When this is done multiple times, each cell will start up in the same state most of the time. These PUFs may be realized on any device having SRAM memory on board.

Any memory showing a random start-up behavior which is sufficiently stable for identifying the memory is called a challengeable memory. As the start-up behavior is random, two different memories will have a large difference in their start-up memory pattern; as the start-up behavior is stable two start-up memory patterns of the same memory will have a small difference. Examples of such memories are SRAM memory cells as mentioned but also other memory cells based on cross-coupled invertors or latches e.g. the butterfly PUF as described in European patent application EP07114732.6 and memory elements like flip-flops. Actually, any type of volatile memory may be used that comprises multiple feedback loops.

A second kind of SRAM based PUFs can be constructed with Dual Port RAM. By writing on both ports at the same time different information, the memory cell is brought into an undefined state and shows a PUF-like behavior. This kind of PUF is described in more detail in WO2009024913. Other so-called Intrinsic PUFs are based on delay phenomena and on the simulation of an SRAM memory cell on the FPGA. The details can be found in US20030204743 (delay PUF) and WO2011018414A2 (butterfly PUF). PUF 110 may be a physical unclonable function comprising a plurality of bus-keepers, e.g. as described in WO2012069545.

Cryptographic device 100 comprises a random number generator 120 arranged to select a first random bit string during the enrollment phase. Both PUF 110 and random number generator 120 produce a bit string during the enrollment phase. However, if the noisy bit string is produced by PUF 110 multiple times, they will lie close together; if random number generator 120 produces a random bit string multiple times, they will generally be unrelated. For example, they may differ close to 50%. A random number generator may be a true random number generator, or a pseudo random number generator.

In an embodiment, the random number generator produces a true random seed from the noisy bit string, e.g., the enrollment bit string, e.g., by applying a cryptographic hash such as sha-256, thereto. In this case the noisy bit string has not been error corrected. The random number generator uses the seed to generate the random bit string.

Cryptographic device 100 comprises a helper data generator 130 arranged to compute a first helper data from at least part of the first noisy bit string and the first random bit string. Helper data comprises redundancy to correct a noisy bit string produced by PUF 110 to be identical to an earlier bit string produced by the same PUF 110. In this case, the first helper data is arranged for later mapping at least part of a second noisy bit string produced by the physically unclonable function to the first random bit string. In an embodiment, helper data is generated for a part of the first noisy bit string that is strictly smaller than the full noisy bit string. In an embodiment, helper data is generated for the full first noisy bit string. Both options have different advantages and more fully explained below.

Generation of helper data for a PUF is known per se. See, e.g., C. Bösch, et. al., Efficient Helper Data Key Extractor on FPGAs, CHES 2008; P. Tuyls, et al., Secure Key Storage with PUFs, Chapter 16 of Springer's book titled "Security with Noisy Data"; Y. Dodis, M. Reyzin, and A. Smith. Fuzzy extractors: How to generate strong keys from biometrics and other noisy data. In C. Cachin and J. Camenisch, editors, Advances in Cryptology I—EUROCRYPT 2004, volume 3027 of LNCS, pages 523-540. Springer-Verlag, 2004.

One possible architecture generating helper data is disclosed in with reference to FIG. 1b. In this implementation, helper data generator 130 comprises a code word generator 131 and a difference unit 132. Code word generator 131 receives a random bit string, e.g. the first random bit string from random number generator 120, and generates a sequence of one or more code words chosen from an error correction code. An error correcting code is a set of code words, such that any two code words of the set have a distance of at least a minimum distance (d). The distance is usually computed as the hamming weight of the XOR difference between the two code words. The minimum distance is at least 3, but is typically higher depending on the error rate of PUF 110. For example, code word generator 131 may encode the random bit string as a sequence of one or more code words. The latter is known as encoding; e.g., transforming an original bit string into an encoded bit string.

Difference unit 132 computes a difference between the noisy bit string, e.g., the enrollment bit string, and the sequence of code words determined by code word generator 131. The difference is typically an XOR operation; this is not necessary, the difference may also be an arithmetical subtraction, etc. The difference is known as helper data. Helper data generator 130 may also be referred to as a fuzzy-extractor. The error correcting code is preferably linear, e.g., a Reed-Solomon code, a Hadamard code, a BCH code, etc. The error correcting code may also be obtained by combing different codes, e.g., code concatenation. Helper data generator 130 has output 133, e.g., the helper data generated for at least part of a noisy bit string and a random bit string. The helper data enables recovery of the random bit string given a noisy bit string that is sufficiently close to the noisy bit string used to generate the helper data.

The helper data generator 130 is typically only applied during the enrollment phase to generate helper data that later can reproduce the first random bit string. However, in an embodiment the helper data generator 130 is used more often, e.g., at each power-up of device 100.

In an embodiment, device 100 comprises a key generator 170 arranged to generate a public key from the first random bit string during the enrollment phase, the public key corresponding to a private key. For example, the key generator 170 may generate a public private key pair for use in asymmetric cryptography. The private key is private to device 100 and in an embodiment never leaves device 100. The public key, however, may be shared with other devices. The private key allows device 100 to decrypt a message encrypted with the public key, and/or to sign a message so that it can be verified with the public key, e.g. using a cryptographic unit. Many public-private key systems exist in the art, e.g., RSA, Elliptic curve cryptography, ECDSA, ECIES, El Gamal, DSA, etc. For example, the first random bit string may be used as a seed to generate primes, say for RSA, or to select a random point on an elliptic curve, etc. The key generator will typically generate both the public and private key from the first random bit string, however, during the enrollment phase only the public key is needed, whereas during the use phase only the private key is needed.

For example, the cryptographic device may be a sensor. Sensor data measured by cryptographic device 100 may be signed by device 100 using the private key.

Returning to FIG. 1a. Cryptographic device 100 comprises an enrollment unit 142. The enrollment unit 142 is arranged to generate a first PUF data from the first noisy bit string during the enrollment phase. The first PUF data, e.g., enrollment data, is sent to a server 200 external to device 100. The first PUF data uniquely identifies the physically unclonable function. The first PUF data comprises at least the first helper data. Cryptographic device 100 further comprises a communication unit 150 arranged to transmit the first PUF data to an electronic server 200 during the enrollment phase. In an embodiment, communication unit 150 is arranged to transmit the first PUF data together with the public key to electronic server 200 during the enrollment phase. After sending the first PUF data, the first helper data, the public key, the private key, the first random bit string, and the first noisy bit string, may all be discarded, e.g., erased from device 100.

Communication unit 150 may be a computer network connection, e.g. over a LAN/WAN network, or over the Internet. The connection may be, e.g., a wireless or wired connection, such as Wi-Fi, or Ethernet.

Sending the first PUF data completes the enrollment phase. Note that in the enrollment phase, the cryptographic device 100 did not need to store any data in non-volatile memory, including, helper data, keys.

During the enrollment phase, cryptographic device sent first PUF data to a sever 200. In the use phase the cryptographic device reconstructs the first random bit string.

Cryptographic device 100 comprises a use-phase unit 144 arranged to generate a second PUF data during the use phase. The second PUF data is derived from the second noisy bit string produced by PUF 110. The second PUF data also uniquely identifies the physically unclonable function. Communication unit 150 is arranged to transmit the second PUF data to server 200 during the use phase, and to receive in response the first helper data from the server. Server 200 identifies cryptographic device 100 from among a plurality of cryptographic devices and sends the first helper data that it received earlier from cryptographic device 100 during the device's enrollment phase.

In the use phase PUF 110 is arranged to produce a second noisy bit string. Cryptographic device 100 comprises an error corrector 160 arranged to determine during the use phase the first random bit string from at least part of the second noisy bit string and the received first helper data. For example, following the example given in FIG. 1b, error corrector 160 may be arranged to add the received first helper data to the at least part of the second noisy bit string. As result, typically, one will obtain a sequence of approximate code words, that is, the sequence of code words plus the same amount of noise as present in the second noisy bit string compared to the first bit string. Error corrector 160 corrects the sequence of approximate code words back to the sequence of code words, e.g., using an error correcting algorithm associated with the error correcting code. Finally, error corrector 160 may decode the sequence of code words to obtain the first random bit string. For example, the key generator may be arranged to construct the private key corresponding to the public key from the first random bit string.

At this point in the use phase, cryptographic device 100 may use the private key, say for encrypting, signing, etc. Nevertheless, cryptographic device 100 did not require non-volatile memory to obtain the private key.

Enrollment unit 142 and use-phase unit 144 may be implemented as separated units. The enrollment unit 142 and use-phase unit 144 may be combined into a combined enrollment/use-phase unit having two modes of operation: an enrollment mode and a use-phase mode. Depending on the mode an enrollment unit part of the combined unit is used or a use-phase part, respectively.

FIG. 1a shows device 100 in communicative contact with server 200, illustrated with a dashed line. In an embodiment, server 200 communicates with a plurality of cryptographic devices like device 100. In addition to cryptographic device 100, FIG. 1a also shows cryptographic devices 100' and 100" of the plurality. Cryptographic devices of the plurality store first helper data at server 200 to error correct their PUF, and use that same PUF to identity itself to server 200. This allows the devices of the plurality to be identical to a large degree. For example, in an embodiment, all information stored on the device, if any, during the enrollment phase is identical for all of the plurality of cryptographic devices. This reduces time to provision the device and the amount of non-volatile memory of the device.

In an embodiment, the cryptographic device 100 is arranged not to write to any non-volatile memory comprised in the device during the enrollment phase. Although some embodiments may perform some writing before the enrollment phase ends, e.g., to write firmware to a flash memory, in other embodiment, no non-volatile storage is needed. In fact, in an embodiment, the cryptographic device does not comprise non-volatile re-writable memory. The device may comprise a ROM storing software.

In an embodiment, the cryptographic device does not comprise multiple micro-fuses arranged to store cryptographic data. Micro fuses are often used to store keys or identifiers that identify the device. Micro fuses are both expensive and time consuming to write, thus it is an advantage to avoid them. Indeed, in an embodiment, the cryptographic device does not comprise a unique, fixed, pre-determined identifier for uniquely identifying the cryptographic device. The noisy bit string produced by PUF 110 cannot be pre-determined; rather the noisy bit string is determined by random fluctuations in the material of PUF 110.

In an embodiment, the cryptographic device comprises a public key of a signing authority, and cryptographic device is arranged to verify a signature of the received first helper data using the public key of the signing authority, the error corrector is arranged not to use the received first helper data in case of a failed verification. For example, the public key may be stored in a non-volatile memory of device 100. The public key may be the same for all cryptographic devices in the plurality. For example, device 100 may comprises a cryptographic unit 180 for verifying a signature of the received first helper data.

In an embodiment, the electronic cryptographic device 100 may contain some non-volatile memory for purposes related to an application running cryptographic device 100. The electronic cryptographic device 100 may also (or instead) contain some non-volatile memory for protecting the device against attacks. For example, non-volatile memory may be used to store a counter to prevent roll-back attacks. In a roll-back attack, a device is brought back entirely to a previous state, negation any changes that have been made in the meantime. A roll-back attack may be prevented by storing a non-decreasing counter, related to the roll-backed data. For example, the counter may indicate a version number of firmware. If the version number of new firmware is below the version indicated in the counter, the firmware is rejected. Nevertheless, even if some non-volatile memory is used, the total amount of non-volatile memory and the time needed for personalization is reduced. Not all implementations require roll-back protection; this depends on the application and/or attack model.

Two different ways to construct the first and second PUF data are explained with reference to FIGS. 3a-4b.

Figure 2:
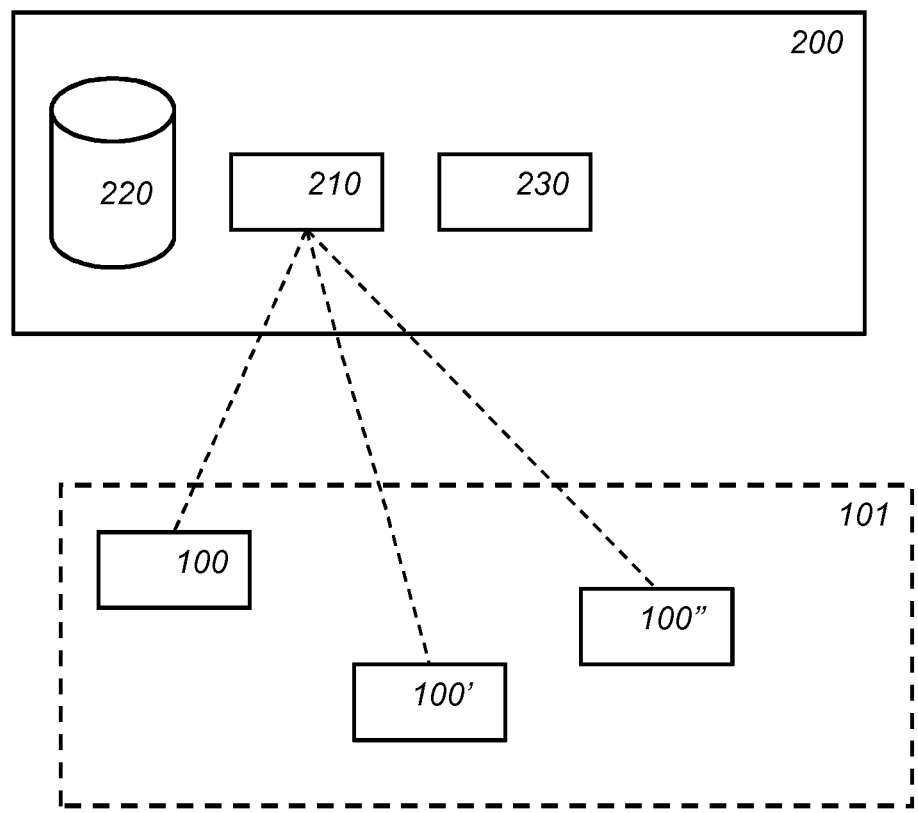

FIG. 2 schematically shows an example of an embodiment of an electronic server 200. FIG. 2 shows server 200 together with a plurality 101 of cryptographic devices. Three devices of the plurality are shown: cryptographic device 100, 100' and 100". The plurality may comprise more devices than three, say more than 1000, more than 10000, etc.

Server 200 comprises a communication unit 210 arranged to receive a first PUF data from cryptographic device 100 during an enrollment phase of cryptographic device 100. The first PUF data uniquely identifies a physically unclonable function of cryptographic device 100 and comprises a first helper data. Communication unit 210 also receives a second PUF data from cryptographic device 100 during the use phase of cryptographic device 100. The second PUF data also uniquely identifies physically unclonable function 110. Similarly, communication unit 210 may receive first and second PUF data from other devices in plurality 101.

Server 200 comprises an electronic database arranged to store at least the first helper data in response to receiving the first PUF data.

Server 200 comprises a response unit 230 arranged to identify the physical unclonable function from the second PUF data, retrieve the first helper data from the database, and transmit the first helper data to the identified cryptographic device using communication unit 210.

Figure 3A:
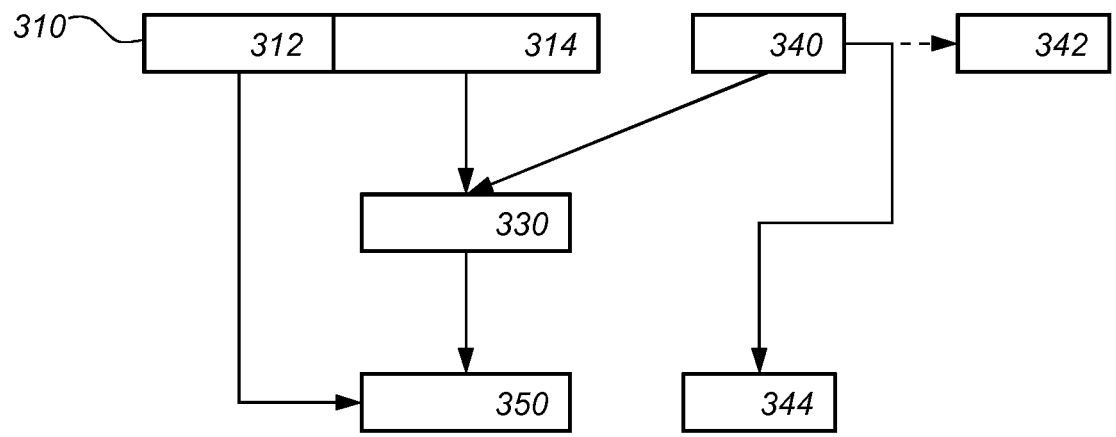

FIG. 3a schematically shows a first example of data in an embodiment of an electronic cryptographic device during the enrollment phase.

Shown is a first noisy bit string 310, e.g., produced by PUF 110. First noisy bit string 310 comprises a first part 314 and a non-overlapping second part 312. Second part 312 identifies PUF 110, and therewith device 100. Also shown is a first random bit string 340, e.g., produced by random number generator 120. Helper data 330 is computed from first part 314 and first random bit string 340; thus given helper data 330 and a second noisy bit string, first random bit string 340 may be reconstructed. First PUF data 350 comprises first helper data 330 and second part 312 of the first noisy bit string. Server 200 may later identify PUF 110 from second part 312 received in first PUF data 350. From first random bit string 340 a public key 344 is generated, and possibly a private key 342. Public key 344 may be transmitted to server 200 together with first PUF data 350.

Database 220 is arranged to store first helper data 330 associated with a second part 312 of first noisy bit string 310 of physically unclonable function 310 of cryptographic device 100. For example, first helper data 330 and second part 312 may be stored in a same record.

Figure 3B:
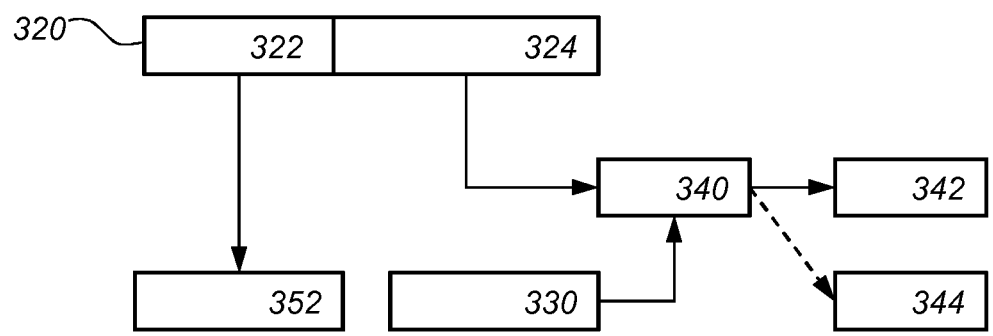

FIG. 3b schematically shows a first example of data in an embodiment of an electronic cryptographic device during the use phase.

Shown is a second noisy bit string 320, e.g., produced by PUF 110. Second noisy bit string 320 comprises a first part 324 and a non-overlapping second part 322. The partitioning of second noisy bit string 320 into two parts is the same as the partitioning as first noisy bit string 310, so that the first and second parts of first noisy bit string 310 are close to the first and second parts of second noisy bit string 320, respectively. Second PUF data 352 comprises second part 322 of second noisy bit string 320. Based on second part 322, server 200 identifies the PUF and retrieves helper data 330 that it received earlier in first PUF data 350. Based on this server 200 returns helper data 330 to cryptographic device 100.

Response unit 230 is arranged to identify the physical unclonable function by determining a difference between second part 322 of a second noisy bit string received in second PUF data 352, and a second part 312 of a first noisy bit 310 string stored in database 220. For example, the physical unclonable function is identified if the difference is less than a first identification threshold. The first identification threshold may be determined from the size of plurality 101, the error rate of the PUFs of the first plurality, and the size of the noisy bit strings. Alternatively, the physical unclonable function may be identified as the second part 312 of a first noisy bit 310 string stored in database 220 for which the difference is smallest over all second parts in database 220.

From first part 324 and helper data 330 the first random bit string 340 is reconstructed; e.g. the error corrector may be arranged to determine the first random bit string from the first part of the second noisy bit string and the received first helper data. From first random bit string 340 a private key 342 is generated, and possibly a public key 344. Public key 342 is typically not needed by cryptographic device 100.

In an embodiment, cryptographic unit 180 may use private key 342, to sign a message and send it to, e.g., server 200, e.g., using communication unit 150. Server 200 can verify the signature using the public key received with the first PUF data 350. In an embodiment, server 200 uses the public key received with the first PUF data 350 to encrypt a message and send it to device 100. Cryptographic unit 180 may use private key 342, to decrypt the message.

The second part of the noisy bit string is used to identify the device. The first part of the noisy bit string may be used for key derivation. Typically, the second part can be much smaller than the first part. The length of the second part used for identification depends, e.g., on the number of device amongst which the device must be identified. The length of the first part depends on the use given the string derived therefrom. For example, a cryptographic key may be required to have a minimum length of, say, 80 bits, 128 bits or even 256 bits etc. In an embodiment, the second part has a smaller bit length than the first part. In an embodiment, the first part is at least twice as long as the second part.

Figure 4A:
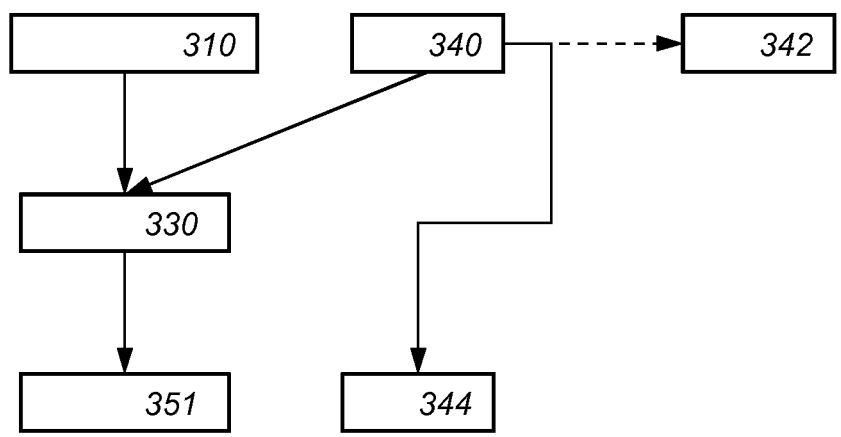

FIG. 4a schematically shows a second example of data in an embodiment of an electronic cryptographic device during the enrollment phase.

Shown is a first noisy bit string 310, e.g., produced by PUF 110. Also shown is a first random bit string 340, e.g., produced by random number generator 120. Helper data 330 is computed from first noisy bit string 310 and first random bit string 340; thus given helper data 330 and a second noisy bit string, first random bit string 340 may be reconstructed. From first random bit string 340 a public key 344 is generated, and possibly a private key 342. Public key 344 may be transmitted to server 200 together with first PUF data 351. Interestingly, in this embodiment first PUF data need not contain any part of first noisy bit string 110 directly. Even though first PUF data 351 is based on a random bit string 340, server 200 is still able to identify device 200 with it.

Figure 4B:
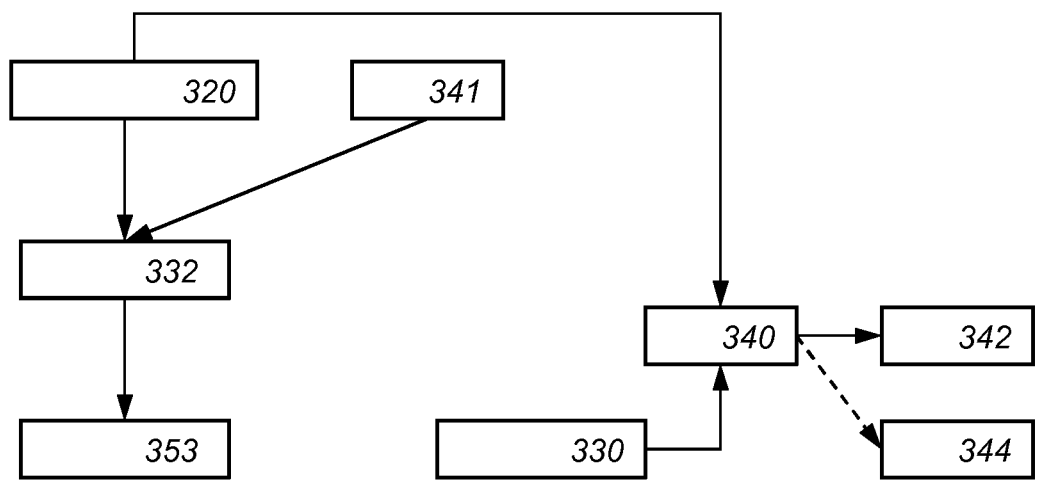

FIG. 4b schematically shows a second example of data in an embodiment of an electronic cryptographic device during the use phase.

Shown is a second noisy bit string 320, e.g., produced by PUF 110. Also shown is a second random bit string 341, e.g., produced by random number generator 120. Second helper data 332 is computed from second noisy bit string 320 and second random bit string 341. Second PUF data 353 comprises second helper data 332.

The second helper data is compared by the server 200 with first helper data 100 to identify PUF 110. Typically, the second helper data will never be used to actually correct a noisy bit string of PUF 110. However, the second helper data is fully functional; the second helper data could be used for later mapping a noisy bit string produced by the physically unclonable function to the second random bit string.

Based on second helper data 332, server 200 identifies the PUF and retrieves helper data 330 that it received earlier in first PUF data 351. Based on this server 200 returns helper data 330 to cryptographic device 100. From noisy bit string 320 and helper data 330 the first random bit string 340 is reconstructed; e.g. the error corrector may be arranged to determine the first random bit string from the second noisy bit string 320 and the received first helper data. From first random bit string 340 a private key 342 is generated, and possibly a public key 344. Public key 342 is typically not needed by cryptographic device 100.

For example, response unit 230 may be arranged to identify PUF 110 by determining a difference between second helper data 332 and the first helper data 330. For example, the second helper data 332 and the first helper data 330 may be XORed together. Next a distance is determined between the difference and the closest one or more code words. The physical unclonable function is identified if the distance is less than a second identification threshold. Alternatively, the first helper data 330 may be chosen that minimizes the distance.

This embodiment will be further illustrated using an example.

We will denote the first noisy bit string as $X^1$ and second noisy bit string as $Y^1$; say of PUF 110. We will denote the first and second noisy bit string of a different device as $X^2$ and $Y^2$ respectively, say of the PUF of device 100'. The sequence of code words determined by the helper data generator of device 100 is $C_1^1 C_2^1 \ldots C_n^1$, and of device 100' by $C_1^2 C_2^2 \ldots C_n^2$. First helper data may be computed as $W_1^1 = X^1 + C_1^1 C_2^1 \ldots C_n^1$ and $W_1^2 = X^2 + C_1^2 C_2^2 \ldots C_n^2$ for device 100 and 100' respectively, in their respective enrollment phases. Server 200 stores both $W_1^1$ and $W_1^2$ in database 220. In the use phase, devices 100 may compute the second helper data as $W_2^1 = Y^1 + C'_1{}^1 C'_2{}^1 \ldots C'_n{}^1$. The Cs denote code words. Both addition and subtractions may be implemented as XOR.

After receiving the second helper data $W_2^1$ from device 100, server 200 needs to select which first helper data stored in database 220 is to be sent back to device 100. Server 200 may proceed by computing the difference between the received second helper data and the stored first helper data:

$$W_1^1 - W_2^1 = (X^1 - Y^1) + (C_1^1 C_2^1 \ldots C_n^1 - C'_1{}^1 C'_2{}^1 \ldots C'_n{}^1) \quad (1)$$

$$W_1^2 - W_2^1 = (X^2 - Y^1) + (C_1^2 C_2^2 \ldots C_n^2 - C'_1{}^1 C'_2{}^1 \ldots C'_n{}^1) \quad (2)$$

The second term in these expressions is a difference between code words. If the error correcting code is linear, these are themselves a sequence of one or more code words. The first term is a difference between noisy bit strings from a PUF. In the case of equation 1, i.e., for the correct match between stored first helper data and received second helper data, the hamming weight of this term is small, and determined by the error rate of the PUF. In case of equation 2, i.e., for the incorrect match between stored first helper data and received second helper data, the hamming weight of this term is large, the term is essentially random. A random bit string added to a sequence of code words is itself a random bit string. Server 200 may now run both differences $W_1^1 - W_2^1$ and $W_1^2 - W_2^1$ through an error corrector applying an error correction algorithm associated with the error correcting code. The result is a sequence of code words for each difference, say $C^1$ and $C^2$. The found sequence code words are subtracted from the difference: $W_1^1-W_2^1-C^1$ and $W_1^2-W_2^1-C^2$.

In case of difference (1), the error rate is small so the code words will be often, or even always, equal to the $(C_1^1 C_2^1 \ldots C_n^1-C'_1{}^1 C'_2{}^1 \ldots C'_n{}^1)$. Accordingly, $W_1^1-W_2^1-C^1$ will be close to $(X^1-Y^1)$ or even equal. The hamming weight of this value is small, as noisy bit strings taken from the same PUF are close together. In case of difference (2) the error rate is large so the code words will be most of the time different. Accordingly, $W_1^2-W_2^1-C^2$ is expected to have a larger hamming weight.

Server 200 can use this to identify the correct first helper data. For each stored first helper data the difference between the stored first helper data and the received second helper data is determined, say using XOR. An error corrector is applied to the difference resulting in the sequence of code words that is nearest to the difference. The further difference is determined between the difference and the sequence of code words. From the further difference the hamming weight is obtained. Over all first helper data the one resulting in the smallest hamming weight may be selected. Alternatively, the first helper data resulting in a hamming weight below the second difference threshold may be used.

The first and second PUF data of FIGS. 4a and 4b have the advantage that less PUF data is required. A smaller PUF may be used, both to identify to server 200 and to derive a key from. Even is an SRAM PUF is used, the memory is preferably not re-used for other purposes to counter aging effects. Using helper data to identify to server 200 allows to reduce the amount of PUF needed. On the other hand, the first and second PUF data of FIGS. 3a and 3b are considerably simpler and require less processing, especially on the side of server 200.

In an embodiment, the random number generator 120 is arranged to generate random numbers based on a noisy bit string obtained from the physically unclonable function 110. For example, random number generator 120 may use the first noisy bit string to derive the first random bit string. If a second random bit string is used, the random number generator 120 may use the second noisy bit string to derive the second random bit string. Instead of the first and second noisy bit string a separate noisy bit string may be obtained from PUF 110; this has the disadvantage of requiring a larger PUF. For example, random number generator 120 may hash the noisy bit string to obtain a hashed noisy bit string, the random number generator 120 being arranged as a pseudo random number generator to generate random numbers from a seed, the seed comprising the hashed noisy bit string. The hash may be a cryptographic hash, say, sha-1, sha-256 etc. The noise in the noisy bit string causes the random bit strings to be at least partly true random.

In an embodiment, the device 110 comprises a batch identifier uniquely identifying a batch of cryptographic devices, the first and second PUF data including the batch identifier. Device 110 is part of the batch identified by the batch identifier. The batch identifier can significantly reduce the computing effort required on the server side when a match has to be found between the second PUF data and the database of first PUF data. Using the batch identifier, the search space can be significantly reduced. The batch identifier may be used in the examples given with reference to FIGS. 3a-3b as well as in the examples given with reference to FIGS. 4a-4b.

For example, the response unit of server 200 may be arranged to identify the physical unclonable function from the second PUF data and the batch identifier. For example, the electronic database may be arranged to store the first helper data and the batch identifier, both obtained from the first PUF data; possibly also including the second part of a first noisy bit string, of this used. The response unit may be arranged to identify the physical unclonable function from the second PUF data by first comparing the batch identifier received in the second PUF data with one or more batch identifiers stored in the database. When the received and stored batch identifiers are equal the response unit may further identify the physical unclonable function by comparing the second part and/or the helper data received in the second PUF data with second PUF data and/or helper data stored with the compared batch identifier.

The batch identifier identifies a batch of cryptographic devices. A batch comprises multiple cryptographic devices, e.g. at least two. The plurality of devices 101 may comprise multiple batches. Suppose, as an example, that the plurality of device 101 comprises 1000 devices of ten batches of each 100 devices. Even if all devices have registered, e.g., by sending a first PUF data, the identification need only compare 100 devices, not a 1000. Batch identifiers may be much smaller than an identifier that uniquely identifies devices instead of batches.

The batch identifier could be embedded in a ROM of device 110 so that manufacturing a new batch with a different batch identifier only involves changing a ROM mask. Alternatively, a batch identifier may be stored on the device, e.g., during manufacture or enrollment.

Typically, the cryptographic devices 100, (and 100', 100") and server 200 each comprise a microprocessor (not shown) which executes appropriate software stored at the device 100 and server 200; for example, that software may have been downloaded and/or stored in a corresponding memory, e.g., a volatile memory such as RAM or a non-volatile memory such as Flash (not shown). Alternatively, the devices 100 and server 200 may, in whole or in part, be implemented in programmable logic, e.g., as field-programmable gate array (FPGA). Devices 100 and 200 may be implemented, in whole or in part, as a so-called application-specific integrated circuit (ASIC), i.e. an integrated circuit (IC) customized for their particular use.

In an embodiment, the electronic cryptographic device comprises a random number generator circuit, a helper data generator circuit, an enrollment unit circuit, a communication unit circuit, a use-phase unit circuit, each arranged for their respective function. In an embodiment, the serve comprises a communication unit circuit, an electronic database circuit, and a response unit circuit. The circuits may be a processor circuit and storage circuit, the processor circuit executing instructions represented electronically in the storage circuits. The circuits may also be, FPGA, ASIC or the like. The system may comprise additional circuits, e.g., a key generation circuit, a cryptographic unit circuit, etc.; the circuits implementing the corresponding units described herein.

Figures 5, 6:
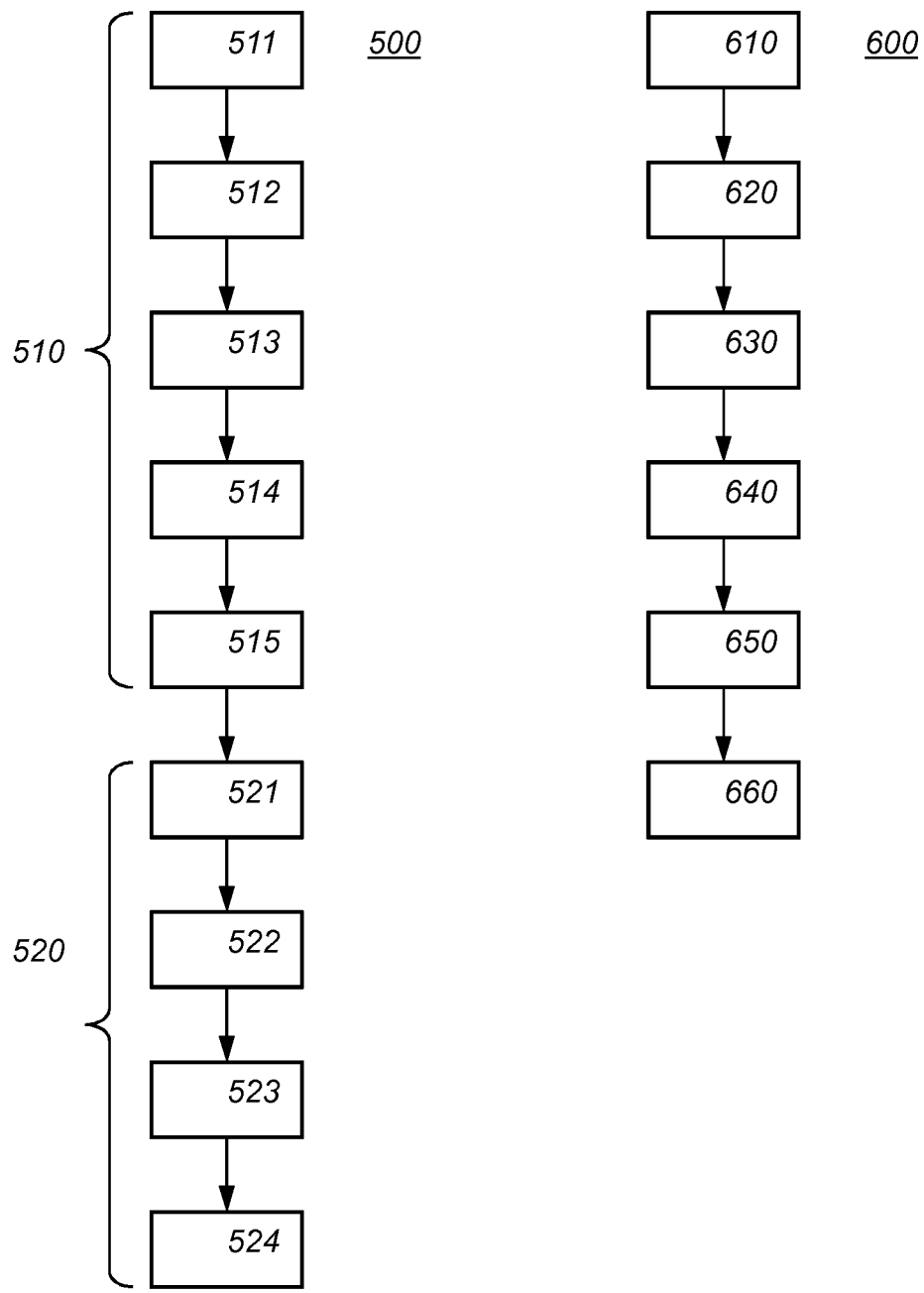

FIG. 5 schematically shows an example of an electronic cryptographic method 500. Method 500 has an enrollment phase 510 and a later use phase 520.

Enrollment phase 510 comprises

Producing 511 a first noisy bit string using a physically unclonable function (PUF), Selecting 512 a first random bit string, Computing 513 a first helper data from at least part of the first noisy bit string and the first random bit string, Generating 514 a first PUF data, the first PUF data being derived from the first noisy bit string, the first PUF data uniquely identifying the physically unclonable function, the first PUF data comprising the first helper data, and Transmitting 515 the first PUF data to an electronic server.

Use phase 520 comprises

Produce 521 a second noisy bit string using the physically unclonable function (PUF), Generating 522 a second PUF data, the second PUF data being derived from the second noisy bit string and uniquely identifying the physically unclonable function, Transmitting 523 the second PUF data to the server and receiving in response the first helper data from the server, Determining 524 the first random bit string from at least part of the second noisy bit string and the received first helper data.

FIG. 6 schematically shows an example of an electronic server method 600,

Method 600 comprises

Receiving 610 a first PUF data from an electronic cryptographic device during an enrollment phase of the cryptographic device, the first PUF data uniquely identifying a physically unclonable function of the cryptographic device, the first PUF data comprising the first helper data, and Storing 620 the first helper data in response to receiving the first PUF data, Receiving 630 a second PUF data from the cryptographic device during the use phase of the cryptographic device, the second PUF data uniquely identifying the physically unclonable function, Identify 640 the physical unclonable function from the second PUF data, Retrieve 650 the first helper data, Transmitting 660 the first helper data to the cryptographic device.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 511 and 512 may be executed, at least partially, in parallel. Moreover, a given step may not have finished completely before a next step is started.

A method according to the invention may be executed using software, which comprises instructions for causing a processor system to perform method 500 or 600. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
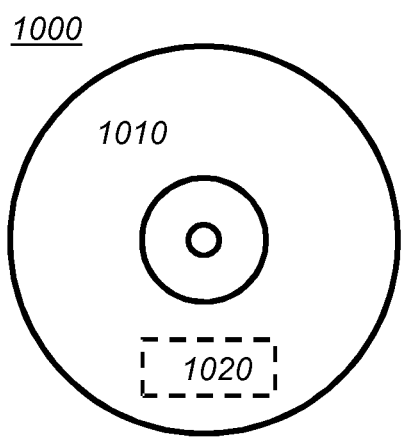
FIG. 7a shows a computer readable medium having a writable part comprising a computer program according to an embodiment.

FIG. 7a shows a computer readable medium 1000 having a writable part 1010 comprising a computer program 1020, the computer program 1020 comprising instructions for causing a processor system to perform a cryptographic method, say method 500, or a server method, say, method 600, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 7B:
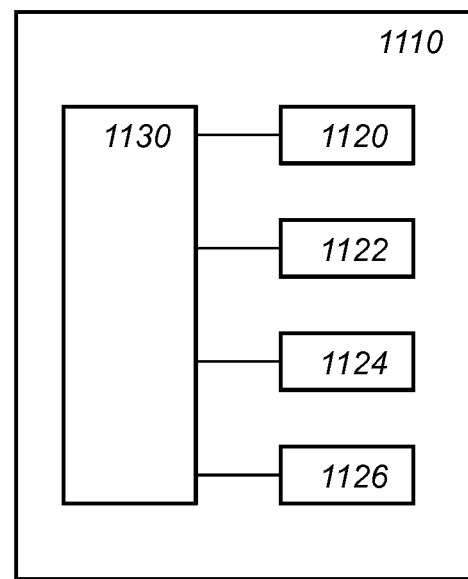
FIG. 7b shows a schematic representation of a processor system according to an embodiment.

FIG. 7b shows in a schematic representation of a processor system 1100 according to an embodiment. The processor system comprises one or more integrated circuits 1110. The architecture of the one or more integrated circuits 1110 is schematically shown in FIG. 7b. Circuit 1110 comprises a processing unit 1120, e.g. a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic cryptographic device configured for an enrollment phase and a later use phase, the cryptographic device comprising:
a physically unclonable function configured to produce a first noisy bit string during the enrollment phase,
a random number generator circuit configured to select a first random bit string during the enrollment phase,
a helper data generator circuit configured to compute a first helper data from at least part of the first noisy bit string and the first random bit string, the first helper data configured for later mapping at least part of a second noisy bit string produced by the physically unclonable function to the first random bit string,
an enrollment unit circuit configured to generate a first PUF data during the enrollment phase, the first PUF data derived from the first noisy bit string, the first PUF data uniquely identifying the physically unclonable function, the first PUF data including the first helper data,
a communication unit circuit configured to transmit the first PUF data to an electronic server during the enrollment phase, the electronic server being arranged to store the first helper data in a database, wherein
the physically unclonable function is configured to produce a second noisy bit string during the use phase,
the cryptographic device includes a use-phase unit circuit configured to generate a second PUF data during the use phase, the second PUF data derived from the second noisy bit string and uniquely identifying the physically unclonable function,
the communication unit circuit is configured to transmit the second PUF data to the server during the use phase, and to receive the first helper data from the server in response to said transmitting of the second PUF data, said server identifying the physically unclonable function of the cryptographic device from among a plurality of cryptographic devices from the second PUF data, and retrieving the first helper data from the database, and
the cryptographic device includes an error corrector circuit configured to determine during the use phase the first random bit string from at least part of the second noisy bit string and the received first helper data.

2. The cryptographic device of claim 1, further comprising:
a key generator circuit configured to generate a public key from the first random bit string during the enrolment phase, the public key corresponding to a private key,
the communication unit circuit configured to transmit the first PUF data together with the public key to an electronic server during the enrollment phase, and
the key generator circuit configured to construct the private key corresponding to the public key from the first random bit string during the use phase.

3. The cryptographic device of claim 1, wherein the first and second noisy bit strings each include a first part and a non-overlapping second part, the second part of the first and second noisy bit strings each uniquely identify the physical unclonable function wherein,
the helper data generator circuit is configured to compute the first helper data from the first part of the first noisy bit string and the first random bit string, helper data configured for later mapping the first part of the second noisy bit string produced by the physically unclonable function to the first random bit string,
the first PUF data including the first helper data and the second part of the first noisy bit string, the second PUF data including the second part of the second noisy bit string,
the error corrector circuit is configured to determine during the use phase the first random bit string from the first part of the second noisy bit string and the received first helper data.

4. The cryptographic device of claim 1, wherein
the random number generator circuit is configured to select a second random bit string during the use phase,
the helper data generator circuit is configured to compute a second helper data from the second noisy bit string and the second random bit string, the second helper data configured for later mapping a noisy bit string produced by the physically unclonable function to the second random bit string,
the second PUF data includes the second helper data, the second helper data uniquely identifying the physical unclonable function to the server.

5. The cryptographic device of claim 1, wherein the random number generator circuit is configured to generate random numbers based on a noisy bit string obtained from the physically unclonable function.

6. The cryptographic device of claim 1, further comprising:
a batch identifier uniquely identifying a batch of cryptographic devices, the first and second PUF data including the batch identifier.

7. The cryptographic device of claim 1, wherein said cryptographic device is one of a plurality of cryptographic devices, wherein all information stored on the device during the enrollment phase is identical for all of the plurality of cryptographic devices.

8. The cryptographic device of claim 1, wherein
the helper data generator circuit is configured to obtain from the first random bit string one or more first code words from an error correcting code, the first helper data being a difference between the first one or more code words and at least part of the first noisy bit string.

9. The cryptographic device of claim 1, wherein:
the cryptographic device comprises a public key of a signing authority, and the cryptographic device is configured to verify a signature of the received first helper data using the public key of the signing authority, the error corrector circuit is configured to use the received first helper data in case of a successful verification of the signature.

10. The cryptographic device of claim 1, wherein
the helper data generator circuit is configured to obtain from the second random bit string one or more second code words from the error correcting code, a second helper data being a difference between the second one or more code words and at least part of the second noisy bit string, the second PUF data including the second helper data.

11. An electronic server, comprising:
a communication unit circuit configured to
receive a first PUF data from an electronic cryptographic device during an enrollment phase of the cryptographic device, the first PUF data being derived from a first noisy bit string, the first noisy bit string being produced by a physically unclonable function of the cryptographic device, the first PUF data uniquely identifying the physically unclonable function of the cryptographic device, the first PUF data including the first helper data, and receive a second PUF data from the cryptographic device during the use phase of the cryptographic device, the second PUF data being derived from a second noisy bit string, the second noisy bit string being produced by the physically unclonable function of the cryptographic device and uniquely identifying the physically unclonable function, an electronic database configured to:
store the first helper data in response to receiving the first PUF data, a response unit circuit configured to
identify the physical unclonable function from the second PUF data from among a plurality of cryptographic devices, and
retrieve the first helper data from the database,
the communication unit circuit configured to transmit the first helper data to the cryptographic device.

12. The electronic server of claim 11, wherein
the electronic database is configured to:
store the first helper data associated with a second part of a first noisy bit string of the physically unclonable function of the cryptographic device,
the response unit circuit is configured to identify the physical unclonable function by
determining a difference between a second part of a second noisy bit string comprised in the second PUF data, and a second part of a first noisy bit string stored in the database.

13. The electronic server of claim 11, wherein:
the response unit circuit is configured to identify the physical unclonable function by
determining a difference between a second helper data comprised in the second PUF data and the first helper data, determine a distance between the difference and one or more code words.

14. A system comprising an electronic cryptographic device and an electronic server, the electronic cryptographic device configured for an enrollment phase and a later use phase, the cryptographic device comprising:
a physically unclonable function configured to produce a first noisy bit string during the enrollment phase,
a random number generator circuit configured to select a first random bit string during the enrollment phase,
a helper data generator circuit configured to compute a first helper data from at least part of the first noisy bit string and the first random bit string, the first helper data configured for later mapping at least part of a second noisy bit string produced by the physically unclonable function to the first random bit string,
an enrollment unit circuit configured to generate a first PUF data during the enrollment phase, the first PUF data derived from the first noisy bit string, the first PUF data uniquely identifying the physically unclonable function, the first PUF data including the first helper data,
a communication unit circuit configured to transmit the first PUF data to the electronic server during the enrollment phase, wherein
the physically unclonable function is configured to produce a second noisy bit string during the use phase,
the cryptographic device includes a use-phase unit circuit configured to generate a second PUF data during the use phase, the second PUF data derived from the second noisy bit string and uniquely identifying the physically unclonable function, the communication unit circuit is configured to transmit the second PUF data to the electronic server during the use phase, and to receive the first helper data from the electronic server in response to said transmitting of the second PUF data,
the cryptographic device includes an error corrector circuit configured to determine during the use phase the first random bit string from at least part of the second noisy bit string and the received first helper data
the electronic server comprising:
a communication unit circuit configured to
receive the first PUF data from the electronic cryptographic device during the enrollment phase of the cryptographic device, and
receive the second PUF data from the cryptographic device during the use phase of the cryptographic device,
an electronic database configured to:
store the first helper data in response to receiving the first PUF data
a response unit circuit configured to
identify the physical unclonable function from the second PUF data from among a plurality of cryptographic devices, and
retrieve the first helper data from the database,
the communication unit circuit configured to transmit the first helper data to the cryptographic device.

15. An electronic cryptographic method having an enrollment phase and a later use phase, the enrollment phase comprising:
producing a first noisy bit string using a physically unclonable function,
selecting a first random bit string,
computing a first helper data from at least part of the first noisy bit string and the first random bit string, the first helper data configured for later mapping at least part of a second noisy bit string produced by the physically unclonable function to the first random bit string,
generating first PUF data, the first PUF data derived from the first noisy bit string, the first PUF data uniquely identifying the physically unclonable function, the first PUF data including the first helper data,
transmitting the first PUF data to an electronic server, the electronic server being configured to store the first helper data in a database,
the use phase including
producing a second noisy bit string using the physically unclonable function,
generating a second PUF data, the second PUF data derived from the second noisy bit string and uniquely identifying the physically unclonable function,
transmitting the second PUF data to the server and receiving the first helper data from the server in response to said transmitting of the second PUF data, said server identifying the physically unclonable function of the cryptographic device from among a plurality of cryptographic devices from the second PUF data and retrieving the first helper data from the database, and
determining the first random bit string from at least part of the second noisy bit string and the received first helper data.

16. An electronic server method comprising:
receiving a first PUF data from an electronic cryptographic device during an enrollment phase of the cryptographic device, the first PUF data being derived from a first noisy bit string, the first noisy bit string being produced by a physically unclonable function of the cryptographic device, the first PUF data uniquely identifying the physically unclonable function of the cryptographic device, the first PUF data including the first helper data, and storing the first helper data in response to receiving the first PUF data, receiving a second PUF data from the cryptographic device during the use phase of the cryptographic device, the second PUF data being derived from a second noisy bit string, the second noisy bit string being produced by the physically unclonable function of the cryptographic device and uniquely identifying the physically unclonable function, identifying the physical unclonable function from the second PUF data from among a plurality of cryptographic devices, retrieving the first helper data, transmitting the first helper data to the cryptographic device.

17. A non-transient computer readable medium embodying a computer program, the computer program comprising instructions which, when executed by a processor subsystem, cause the processor subsystem to perform an cryptographic method, the cryptographic method having an enrollment phase and a later use phase, the enrollment phase comprising:

producing a first noisy bit string using a physically unclonable function, selecting a first random bit string, computing a first helper data from at least part of the first noisy bit string and the first random bit string, the first helper data configured for later mapping at least part of a second noisy bit string produced by the physically unclonable function to the first random bit string, generating first PUF data, the first PUF data derived from the first noisy bit string, the first PUF data uniquely identifying the physically unclonable function, the first PUF data including the first helper data, transmitting the first PUF data to an electronic server, the electronic server being configured to store the first helper data in a database, the use phase including producing a second noisy bit string using the physically unclonable function, generating a second PUF data, the second PUF data derived from the second noisy bit string and uniquely identifying the physically unclonable function, transmitting the second PUF data to the server and receiving the first helper data from the server in response to said transmitting of the second PUF data, said server identifying the physically unclonable function of the cryptographic device from among a plurality of cryptographic devices from the second PUF data and retrieving the first helper data from the database, and determining the first random bit string from at least part of the second noisy bit string and the received first helper data.

18. A non-transient computer readable medium embodying a computer program, the computer program comprising instructions which, when executed by a processor subsystem, cause the processor subsystem to perform a server method, the server method comprising:

receiving a first PUF data from an electronic cryptographic device during an enrollment phase of the cryptographic device, the first PUF data being derived from a first noisy bit string, the first noisy bit string being produced by a physically unclonable function of the cryptographic device, the first PUF data uniquely identifying the physically unclonable function of the cryptographic device, the first PUF data including the first helper data, and storing the first helper data in response to receiving the first PUF data, receiving a second PUF data from the cryptographic device during the use phase of the cryptographic device, the second PUF data being derived from a second noisy bit string, the second noisy bit string being produced by the physically unclonable function of the cryptographic device and uniquely identifying the physically unclonable function, identifying the physical unclonable function from the second PUF data from among a plurality of cryptographic devices, retrieving the first helper data, transmitting the first helper data to the cryptographic device.

19. An electronic cryptographic device configured for an enrollment phase and a later use phase, the cryptographic device comprising:

a physically unclonable function configured to produce a first noisy bit string during the enrollment phase, wherein the physically unclonable function is configured to produce a second noisy bit string during the use phase, a microprocessor, a memory comprising instructions which, when executed by the microprocessor, cause the microprocessor to:

select a first random bit string during the enrollment phase, compute a first helper data from at least part of the first noisy bit string and the first random bit string, the first helper data configured for later mapping at least part of a second noisy bit string produced by the physically unclonable function to the first random bit string, generate a first PUF data during the enrollment phase, the first PUF data derived from the first noisy bit string, the first PUF data uniquely identifying the physically unclonable function, the first PUF data including the first helper data, transmit the first PUF data to an electronic server during the enrollment phase, the electronic server being arranged to store the first helper data in a database, generate a second PUF data during the use phase, the second PUF data derived from the second noisy bit string and uniquely identifying the physically unclonable function, transmit the second PUF data to the server during the use phase, and to receive the first helper data from the server in response to said transmitting of the second PUF data, said server identifying the physically unclonable function of the cryptographic device from among a plurality of cryptographic devices from the second PUF data, and retrieving the first helper data from the database, and determine during the use phase the first random bit string from at least part of the second noisy bit string and the received first helper data.

20. An electronic server, comprising:

a communication connection configured to receive a first PUF data from an electronic cryptographic device during an enrollment phase of the cryptographic device, the first PUF data being derived from a first noisy bit string, the first noisy bit string being produced by a physically unclonable function of the cryptographic device, the first PUF data uniquely identifying the physically unclonable function of the cryptographic device, the first PUF data comprising the first helper data, and receive a second PUF data from the cryptographic device during the use phase of the cryptographic device, the second PUF data being derived from a second noisy bit string, the second noisy bit string being produced by the physically unclonable function of the cryptographic device and uniquely identifying the physically unclonable function, a microprocessor, a memory comprising instructions which, when executed by the microprocessor, cause the microprocessor to:

store the first helper data in response to receiving the first PUF data, identify the physical unclonable function from the second PUF data from among a plurality of cryptographic devices, retrieve the first helper data from the database, and transmit the first helper data to the cryptographic device.

\* \* \* \* \*